(12) United States Patent
Johnson

(10) Patent No.: US 11,407,339 B2
(45) Date of Patent: Aug. 9, 2022

(54) BED SUPPORT MECHANISM FOR A BED LIFT

(71) Applicant: Lippert Components, Inc., Elkhart, IN (US)

(72) Inventor: Chad Johnson, Kaysville, UT (US)

(73) Assignee: Lippert Components, Inc., Elkhart, IN (US)

( * ) Notice: Subject to any disclaimer, the term of this patent is extended or adjusted under 35 U.S.C. 154(b) by 311 days.

(21) Appl. No.: 16/247,536

(22) Filed: Jan. 14, 2019

(65) Prior Publication Data

US 2019/0217752 A1 Jul. 18, 2019

Related U.S. Application Data

(60) Provisional application No. 62/617,219, filed on Jan. 13, 2018.

(51) Int. Cl.
*B60N 2/34* (2006.01)
*B60N 2/90* (2018.01)
*B60N 3/00* (2006.01)

(52) U.S. Cl.
CPC ............... *B60N 2/34* (2013.01); *B60N 2/919* (2018.02); *B60N 3/008* (2013.01); *B60N 2002/952* (2018.02)

(58) Field of Classification Search
CPC .......... B60N 2/34; B60N 2/366; B60N 3/008; B60N 2002/952; A47C 17/80; A47C 17/84; A47C 19/20; A47C 19/202
See application file for complete search history.

(56) References Cited

U.S. PATENT DOCUMENTS

| | | | | |
|---|---|---|---|---|
| 3,028,606 A | * | 4/1962 | Paul | A47C 17/84 5/9.1 |
| 3,266,062 A | * | 8/1966 | Rogers | A47C 17/84 5/118 |
| 3,494,656 A | * | 2/1970 | McIntire | A47C 17/80 296/156 |
| 3,524,673 A | * | 8/1970 | Beeson | A47C 17/80 296/156 |
| 4,837,877 A | * | 6/1989 | Hamada | A47C 17/84 5/10.2 |
| 5,092,650 A | * | 3/1992 | Perlot | B60P 3/38 296/164 |
| 5,377,787 A | * | 1/1995 | Chabrier | A47C 17/84 187/206 |
| 5,687,655 A | * | 11/1997 | Weinschenk, Jr | A47B 9/02 108/147 |
| 6,557,190 B2 | * | 5/2003 | Bailey | A47C 17/84 296/190.02 |
| 6,629,322 B1 | * | 10/2003 | Monroe | A47C 17/84 5/10.2 |
| 7,347,484 B2 | * | 3/2008 | Nebel | A47C 17/80 296/156 |

(Continued)

*Primary Examiner* — David R Hare
(74) *Attorney, Agent, or Firm* — FisherBroyles, LLP

(57) ABSTRACT

A bed lift includes a bed support mechanism used to hold a bed in a raised position. The bed support mechanism includes a catch mechanism and a release mechanism. The release mechanism is configured to move the catch mechanism between an engaged position where the catch mechanism holds the bed in the raised position and a disengaged position where the catch mechanism does not hold the bed in the raised position.

20 Claims, 10 Drawing Sheets

(56) References Cited

U.S. PATENT DOCUMENTS

| | | | |
|---|---|---|---|
| 7,455,629 B2* | 11/2008 | Abelbeck | A63B 21/078 482/101 |
| 8,152,258 B2* | 4/2012 | Kang | F25D 25/02 312/408 |
| 8,336,940 B2 | 12/2012 | Rasmussen | |
| 9,545,871 B2* | 1/2017 | Quigley | H02P 7/06 |
| 9,656,590 B2 | 5/2017 | Johnson et al. | |
| 10,806,269 B2* | 10/2020 | Baden | A47C 19/021 |
| 2004/0262949 A1* | 12/2004 | Rasmussen | F16M 13/02 296/158 |
| 2005/0239586 A1* | 10/2005 | Nebel | A63H 17/05 474/58 |
| 2006/0066131 A1* | 3/2006 | Nebel | B60P 1/02 296/156 |
| 2006/0260044 A1* | 11/2006 | Nebel | A47C 17/84 5/118 |
| 2007/0226901 A1* | 10/2007 | Pervorse | B60P 3/39 5/118 |
| 2008/0036239 A1* | 2/2008 | Blodgett | B60P 3/39 296/156 |
| 2008/0116012 A1* | 5/2008 | Ferguson | B60P 3/36 187/213 |
| 2015/0329035 A1* | 11/2015 | Johnson | A47C 17/80 296/24.33 |

* cited by examiner

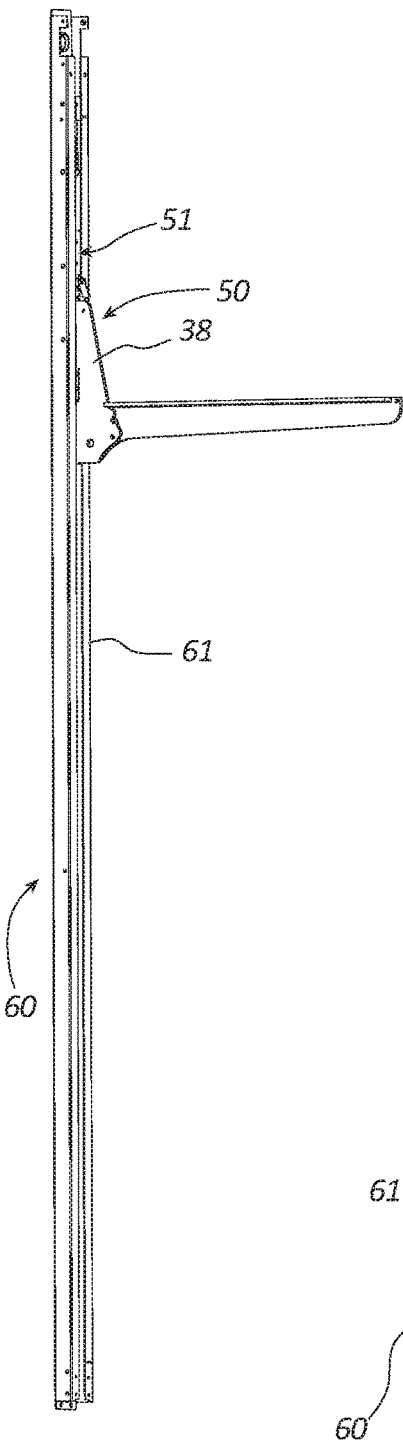
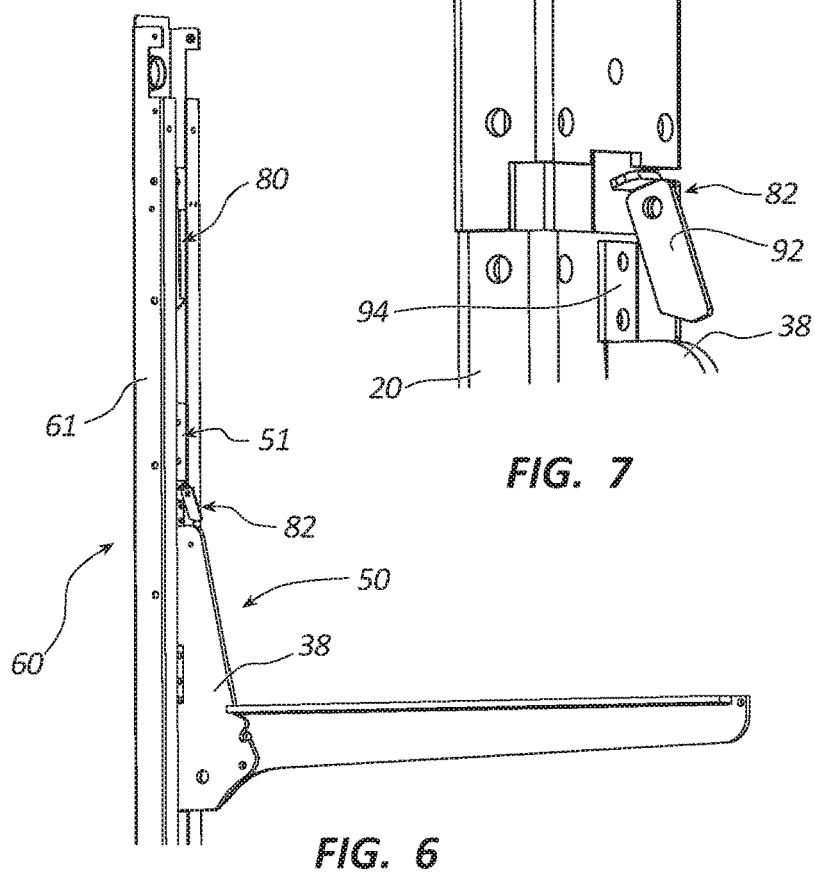
FIG. 5
FIG. 6
FIG. 7

BED SUPPORT MECHANISM FOR A BED LIFT

BACKGROUND

Toy hauler recreational vehicles can include double bunk bed lift systems positioned in the cargo area to provide additional sleeping and/or seating space. In many of these systems, the upper bunk can be held in the raised position and the lower bunk can be lowered separately. This may be desirable in a variety of situations such as those where the lower bunk converts into a seating unit. Holding the upper bunk in the raised position provides additional clearance for users sitting on the lower bunk.

The conventional method of holding the upper bunk in the raised position is with pins extending through holes in corresponding C-channels that are part of the bed lift and are attached to the wall of the toy hauler. An example of this configuration is shown in FIGS. 106-108 of U.S. Pat. No. 8,336,940. The process of pinning the upper bed in the raised position includes raising both the lower bed and the upper bed to the raised position and inserting the pins through the holes in the C-channel. The pins hold the upper bed in place and allow the lower bed to be lowered separately.

Although the pins provide a functional and useful way to hold the upper bed in the raised position, the user must insert the pins into the C-channels while the lower bed is positioned against the underside of the upper bed. This can be difficult depending on the configuration of the interior of the toy hauler and/or relative position of the beds to the C-channels. For example, the C-channels can be positioned closer to the center of the beds making it difficult for the user to insert the pins. It would be desirable to have an easier way to hold and release the upper bed.

SUMMARY

A bed lift is described having an improved bed support mechanism for holding a bed in a given position. The bed lift can be used to lift one, two, or more beds in a variety of applications. The bed support mechanism can be used to support the one or more beds in any position. In one implementation, the bed lift is configured to lift at least two beds between a lowered and a raised position, and the bed support mechanism is used to selectively support the upper bed in the raised position.

The bed support mechanism includes a catch mechanism and a release mechanism. The catch mechanism selectively holds the bed in the desired position or releases the bed from the desired position. The user can adjust the release mechanism so that the catch mechanism selectively holds or releases the upper bed.

The bed lift can be implemented in various ways to realize one or more of the following potential advantages. One advantage is that the release mechanism can be positioned in a location that is readily accessible to the user such as on a lower bed assembly. This makes it easier to selectively hold or release the upper bed compared to removing and inserting the pins in the conventional bed lift mechanism. Another advantage is that the bed support mechanism is a modular component that can be added to the bed lift 12 after it is manufactured. For example, a user could can buy the bed support mechanism and add it to the bed lift 12 at any time. Another advantage is that the release mechanism can be set to a given position and the upper bed will either be held or released.

One innovative aspect of the bed lift can be implemented by coupling the catch mechanism to a guide rail. The catch mechanism can include a biasing component that biases the catch mechanism towards a position where it holds the upper bed in the raised position. The catch mechanism can hold the upper bed by engaging the underside of a carriage member used to guide vertical movement of the upper bed.

Another innovative aspect of the bed lift can be implemented by coupling the release mechanism to a carriage assembly used to lower and raise the lower bed. The user can adjust the release mechanism when the lower bed is in the lowered position and then raise the lower bed until the release mechanism reaches the catch mechanism. The release mechanism, depending on how it is configured, can disengage the catch mechanism to allow the upper bed to be lowered or let the catch mechanism engage the carriage member of the upper bed and hold it in the raised position.

Another innovative aspect of the bed lift can be implemented using an electronic control system configured to move the release mechanism between a first position where prevents the catch mechanism from holding the upper bed in the raised position and a second position where it does not prevent the catch mechanism from holding the upper bed in the raised position. The electronic control system can include a switch that the user actuates to change the state of the release mechanism as well as a motor or other actuation device configured to change the state of the release mechanism.

It should be appreciated that the bed lift can have any suitable configuration and be used in any suitable application. For example, the bed lift can be any of those described in the incorporated documents. Also, the lower bed can be any of those described in the incorporated documents including those that convert between a seating configuration and a sleeping configuration.

The systems, methods, and devices of this disclosure each have several innovative aspects, no single one of which is solely responsible for the described desirable attributes. The summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other implementations are disclosed in association with the accompanying drawings in which:

FIG. 5 is a perspective view of one implementation of a lifting assembly of the bed lift in FIG. 1.

FIG. 6 is a perspective view of the top of the lifting assembly in FIG. 5.

FIG. 7 is a perspective view of one implementation of a bed support mechanism positioned in the lifting assembly in FIG. 5. The bed support mechanism includes a catch mechanism and a release mechanism.

DETAILED DESCRIPTION

Figure 1:
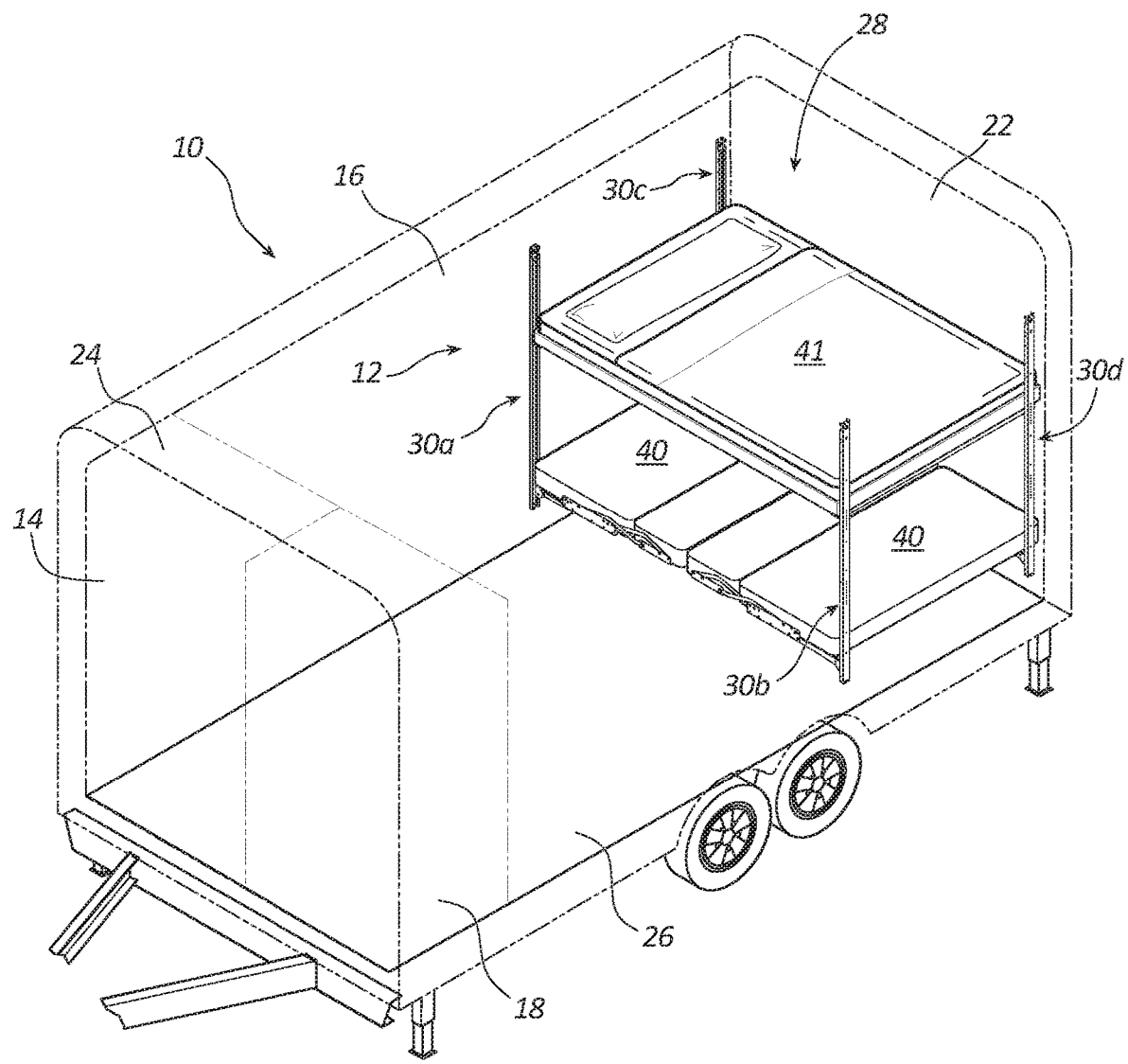
FIG. 1 is a partially exploded perspective view of one implementation of a bed lift in a toy hauler type recreational vehicle. The bed lift is in a double bunk configuration where the lower bed and the upper bed are spaced apart in a lowered position.

Referring to FIGS. 1-4, a recreational vehicle 10 includes a bed lift 12 (alternatively referred to as a bed lift mechanism or lifting system) configured to raise and lower a first bed or lower bed 40 and a second bed or upper bed 41. The vehicle 10 is a toy hauler type recreational vehicle and includes a front wall 14, a first side wall 16, a second side wall 18, a rear wall 22, a ceiling 24, and a floor 26. The vehicle 10 also includes a cargo area 28 configured to receive and/or transport off-road vehicles including personal recreational vehicles such as four-wheelers, motorcycles, snowmobiles, dune buggies, personal watercraft, and the like.

The rear wall 22 can be used as both a door to enter the vehicle 10 and as a ramp to move an off-road vehicle into and/or out of the cargo area 28. The rear wall 22 pivots on an axis between a closed position (shown in FIGS. 1-4) and an open position (not shown). In the open position, the rear wall 22 can be used as a ramp to drive or otherwise move an off-road vehicle into and/or out of the cargo area 28. Although, the entire rear wall 22 is shown as being used as a ramp, in other embodiments, less than all the rear wall 22 may be used as a door and/or ramp.

It should be appreciated that the bed lift 12 can be included in a wide variety of structures besides the vehicle 10. The bed lift 12 can be included any of a number of mobile and immobile structures. Mobile structures include, but are not limited to, structures such as land vehicles (e.g., recreational vehicles, trailers, motorized vehicles, vehicles used to travel on a road, wheeled vehicles, railroad cars, buses, semi-trucks, and the like), watercraft (e.g., ships, boats, houseboats, cruise ships, yachts, and the like), aircraft, and any other mobile vehicles. Immobile structures include, but are not limited to, structures such as a building, edifice, etc.

In some implementations, the bed lift 12 can be used with structures that are used as or include living quarters. For example, the bed lift 12 can be used with any of the mobile and immobile structures previously described which can be used as living quarters. Structures which can be used as living quarters include, but are not limited to, homes, houses, residences, condominiums, abodes, dwellings, lodgings, recreational vehicles (e.g., travel trailers, fifth wheels, truck campers, toy haulers, snowmobile trailers, motor homes) car haulers (e.g., vehicles used to haul cars and/or other vehicles to races such as NASCAR races, etc.), houseboats, cruise ships, and the like. In another embodiment, any structure which is suitable for or designed principally for habitation by people either on a permanent (e.g., a house) or a temporary (e.g., hotel) basis can be used with the bed lift 12.

The bed lift 12 includes lifting assemblies 30a, 30b, 30c, 30d (collectively "the lifting assemblies 30" and alternatively referred to as sliding assemblies or sliding mechanisms) The lifting assemblies 30a, 30c are coupled to the first side wall 16 and the lifting assemblies 30b, 30d are coupled to the second side wall 18. The lifting assemblies 30 are used to vertically move beds 40, 41 between a lowered position and a raised position.

Figure 2:
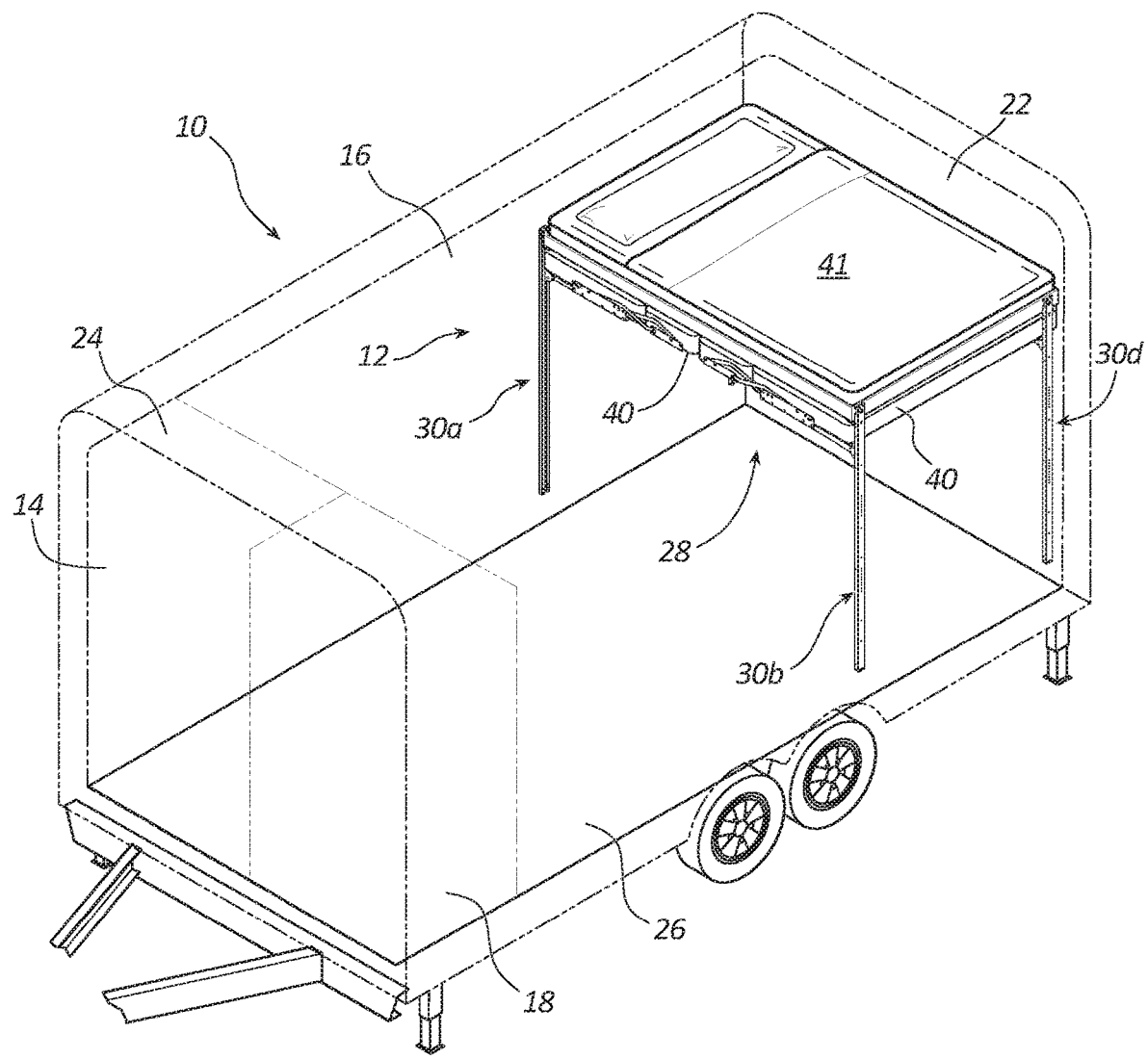
FIG. 2 is a partially exploded perspective view of the recreational vehicle in FIG. 1 with the bed lift in a stowed configuration where the lower bed and the upper bed are raised to a position adjacent the ceiling of the vehicle.
Figure 3:
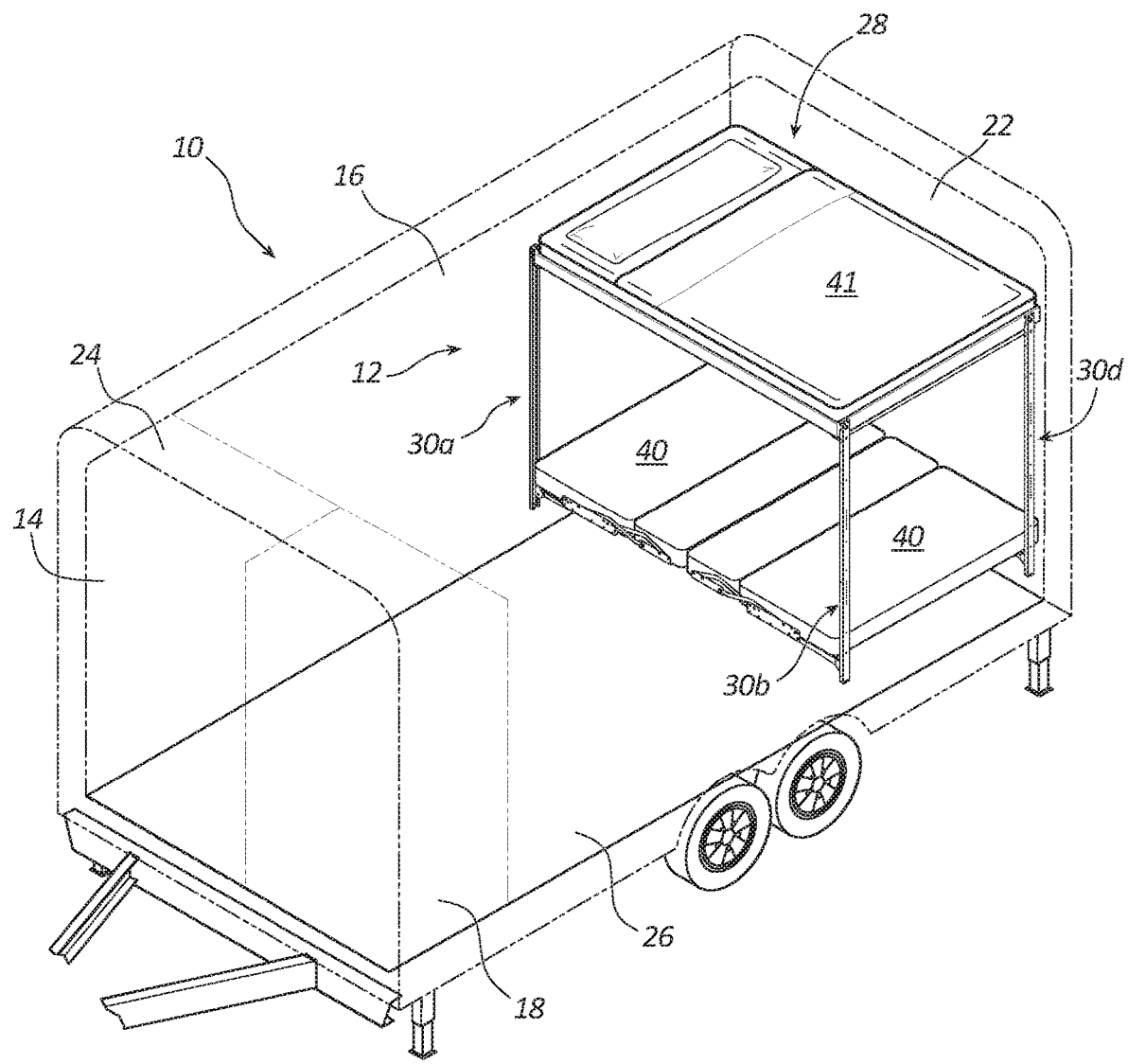
FIG. 3 is a partially exploded perspective view of the recreational vehicle in FIG. 1 with the bed lift in a single bunk configuration where the lower bed is in the lowered position and the upper bed is in the raised position and stowed adjacent to the ceiling.
Figure 4:
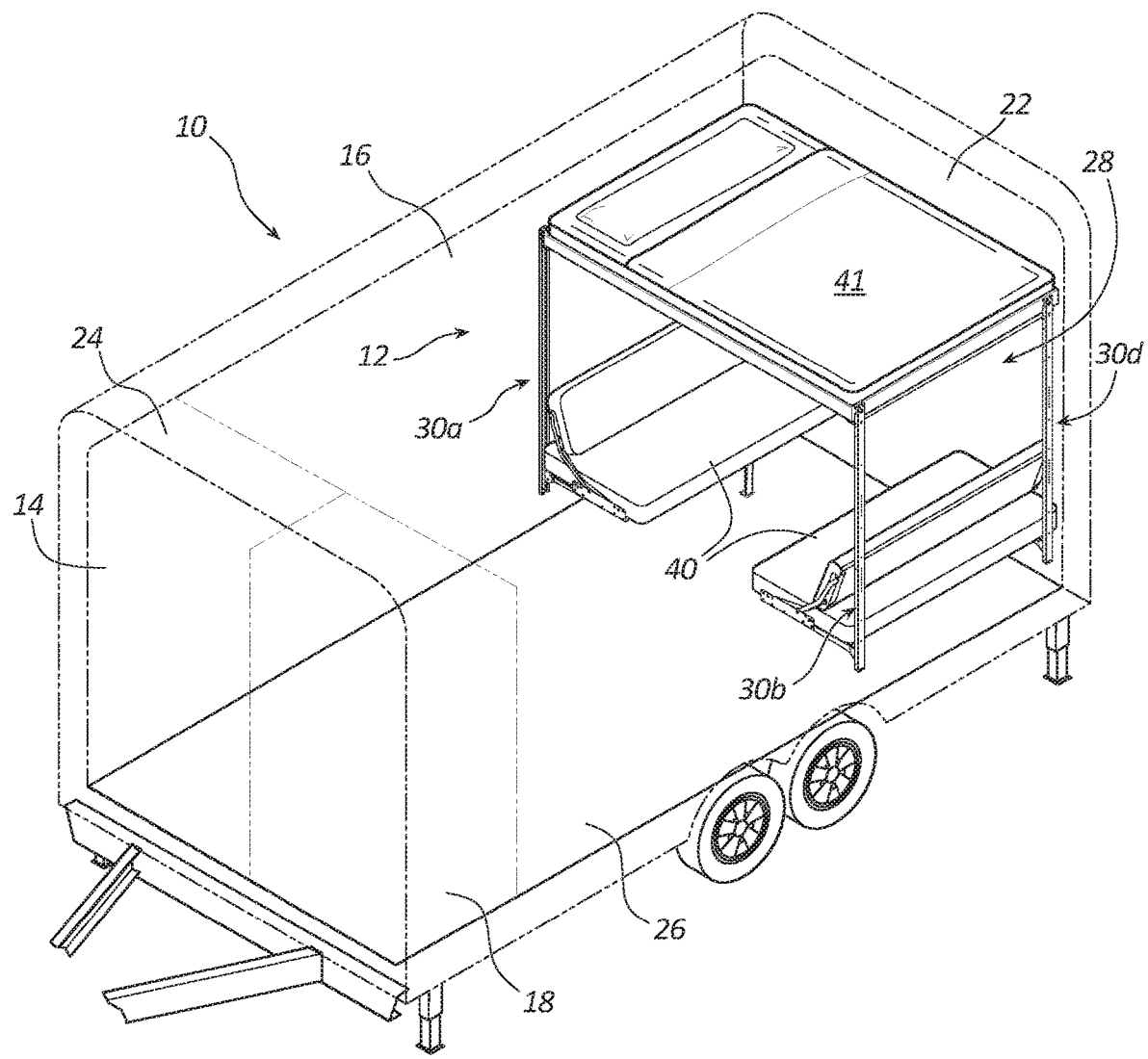
FIG. 4 is a partially exploded perspective view of the recreational vehicle in FIG. 1 with the bed lift in a seating configuration where the lower bed is in the lowered position and transformed into opposite facing seating units and the upper bed is in the raised position and stowed adjacent to the ceiling.
Figure 8:
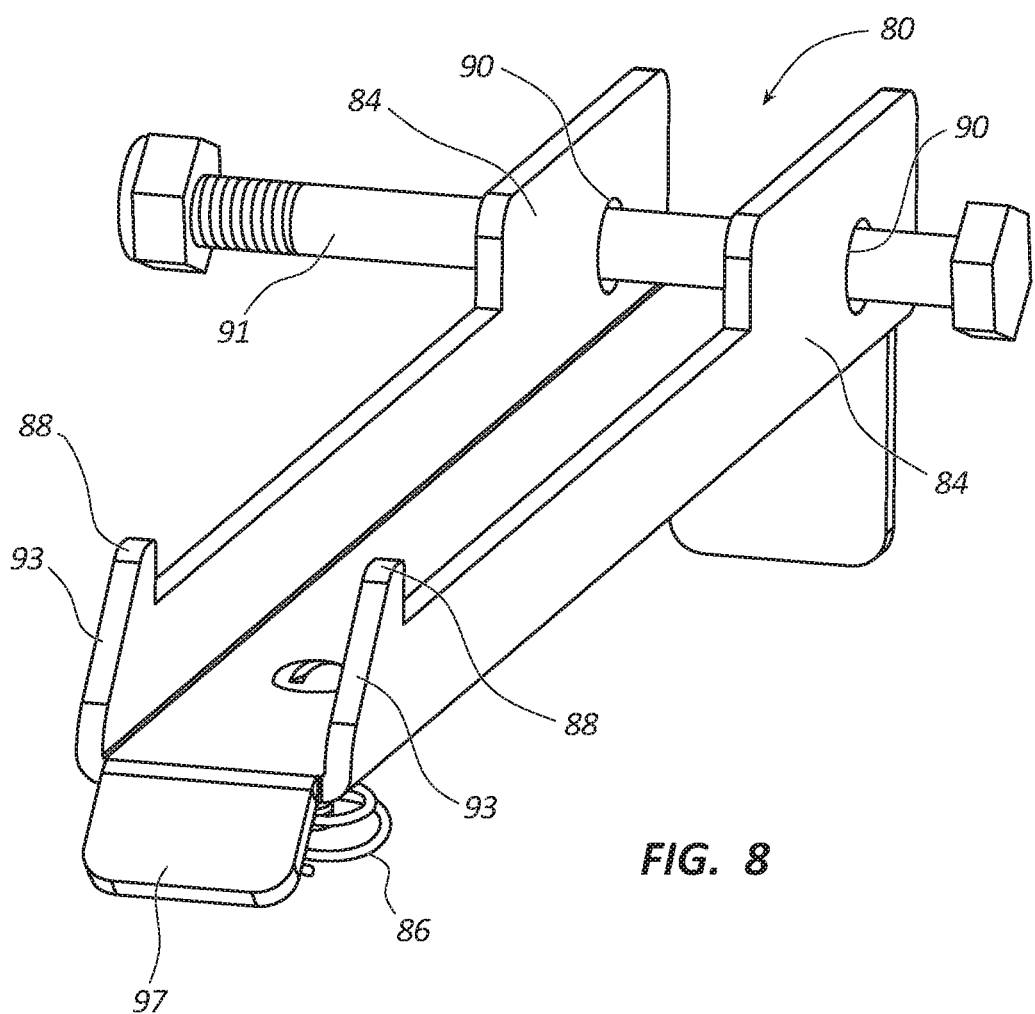
FIG. 8 is a perspective view of the catch mechanism in FIG. 7.
Figure 9:
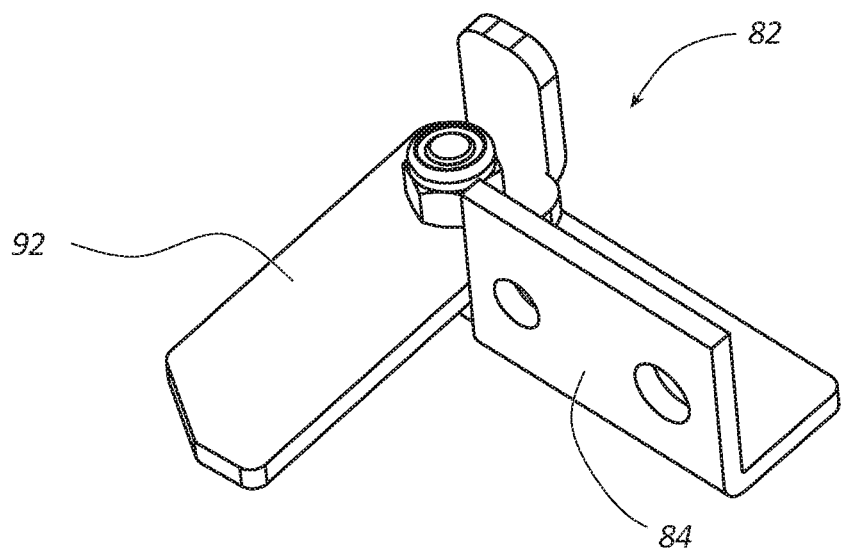
FIG. 9 is a perspective view of the release mechanism in FIG. 7.

The bed lift 12 can be used to move the beds 40, 41 between the different configurations shown in FIGS. 1-4. FIG. 1 shows the beds 40, 41 in a double bunk configuration where the lower bed 40 and the upper bed 41 are spaced apart in the lowered position. FIG. 2 shows the beds 40, 41 in a stowed configuration where the lower bed 40 and the upper bed 41 are in the raised position. FIG. 3 shows the beds 40, 41 in a single bunk configuration where the lower bed 40 is in the lowered position and the upper bed 41 is in the raised position and stowed adjacent to the ceiling 24. FIG. 4 shows the beds 40, 41 in a seating configuration where the upper bed 41 is stowed and the lower bed 40 is transformed into opposite facing seating units, which each include a seat back and a seat base.

The lifting assemblies 30a, 30b, 30c, 30d each include a first or lower carriage assembly 50 (alternatively referred to as a lower moving assembly), a second or upper carriage assembly 51 (alternatively referred to as an upper moving assembly) and a guide assembly 60 as shown in FIGS. 5-6. The lower carriage assemblies 50 are coupled to the lower bed 40 and the upper carriage assemblies 51 are coupled to the upper bed 41. The carriage assemblies 50, 51 cooperate with the corresponding guide assemblies 60 to vertically move the beds 40, 41 between the configurations shown in FIGS. 1-4. The carriage assemblies 50, 51 slide in the channels formed by the guide assemblies 60. Additional details about the operation and configuration of the lifting assemblies 30 can be found in the incorporated documents.

The carriage assemblies 50, 51 each include a carriage member 20, 62, respectively (the carriage members can alternatively be referred to as moving members or sliding members). The carriage assembly 50 also includes a support bracket 38 configured to be coupled to the lower bed 40. The carriage assembly 51 also includes a support bracket (not shown) configured to be coupled to the upper bed 41. The guide assemblies 660 each include a guide rail 61 (alternatively referred to as guide members), which forms a channel in which the carriage members 20, 62 can move. The carriage assemblies 50, 51 are slidably coupled to the guide rail 61 and move between the same positions and configurations as the beds 40, 41.

At least one of the lifting assemblies 30 (preferably all) includes a bed support mechanism, which is used to selectively hold the upper bed 41 in the raised position. The bed support mechanism includes a catch mechanism 80 (alternatively referred to as a catch assembly) and a release mechanism 82 (alternatively referred to as a release device). The catch mechanism 80 is configured to catch and securely hold the upper bed 41 in a raised position. The release mechanism 82 is configured to selectively engage the catch mechanism 80 and release the upper bed 41.

The catch mechanism 80 includes a biasing component or biasing member 86 coupled to an elongated main body 84. The main body 84 has a U-shape and the sides are notched to form projections or catches 88. The main body 84 is configured to fit inside the C-shaped channel of the guide rail 61 and to be held in place by a fastener 91 such as a bolt or pin that extends through holes in the guide rail 61 and corresponding holes 90 in the main body 84.

It should be appreciated that the catch mechanism 80 can be coupled to the guide rail 61 at any suitable location. It is generally preferred to position the catch mechanism 80 near the top of the guide rail 61 to hold the upper bed 41 in the raised position. However, there may be situations where it is desirable to position the catch mechanism 80 at other locations on the guide rail 61.

The catch mechanism 80 rotates on the axis of the fastener 91 between a first position where the catch mechanism 80 holds the upper bed 41 in the raised position and a second position where the catch mechanism 80 does not hold the upper bed 41 in the raised position. The biasing component 86 biases the catch mechanism 80 to the first position. Specifically, the biasing component 86 biases the main body 84 outward from the back wall of the guide rail 61 so that the projections 88 engage the bottom edge of the carriage number 62.

Figure 10:
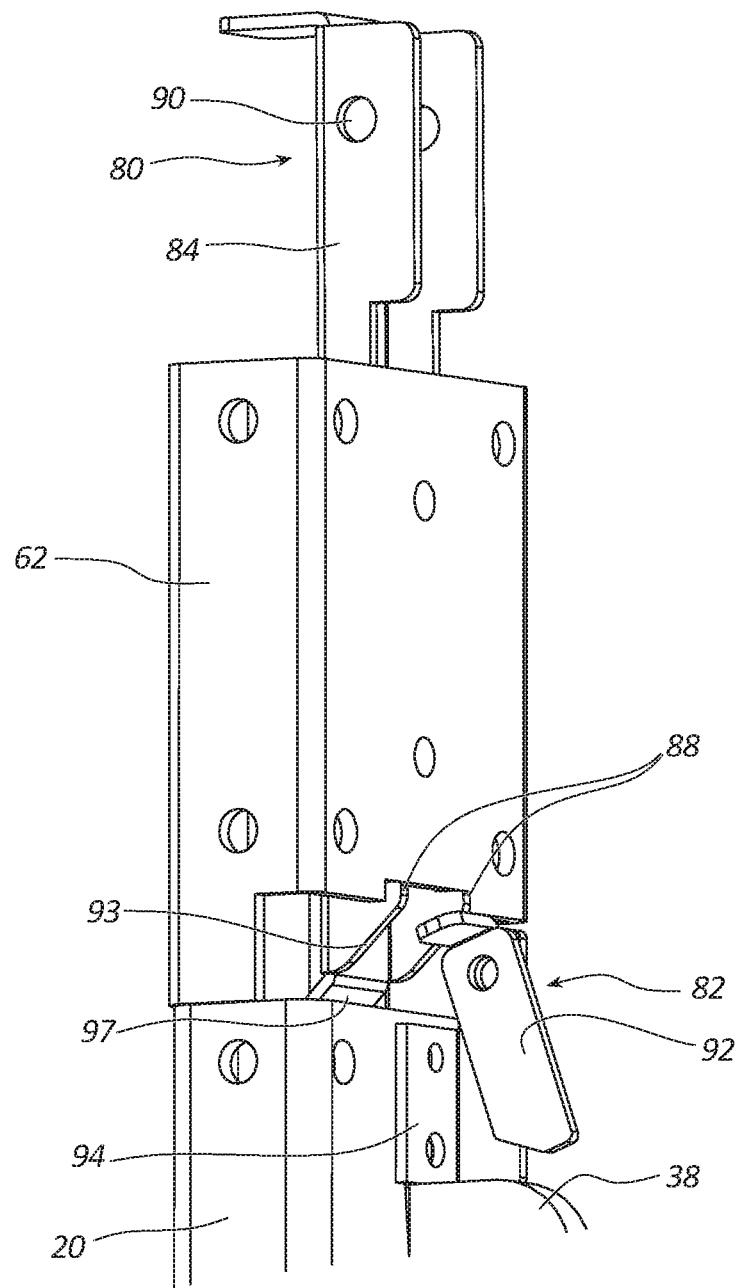
FIG. 10 is a perspective view of the bed support mechanism in FIG. 7 showing the catch mechanism holding the upper carriage member and the release mechanism in a position where it does not prevent the catch mechanism from holding the upper carriage member.
Figure 11:
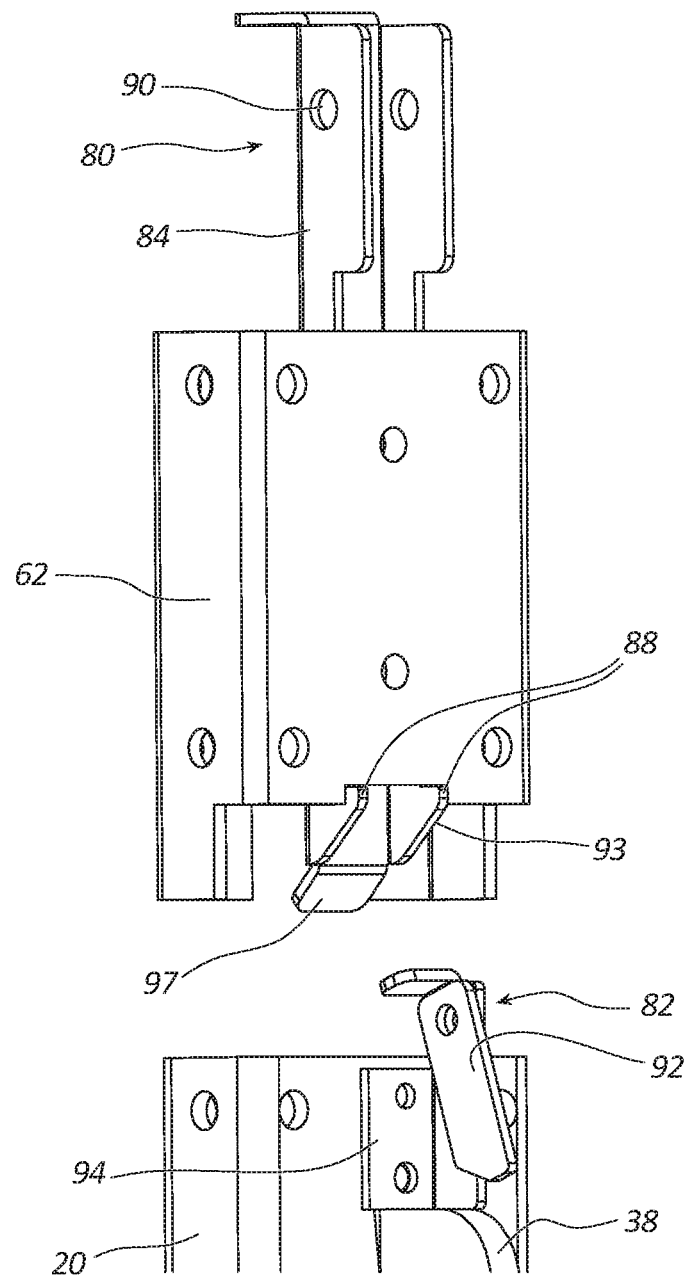
FIG. 11 is a perspective view of the bed support mechanism in FIG. 10 with the lower carriage member being lowered below and spaced apart from the upper carriage member.
Figure 12:
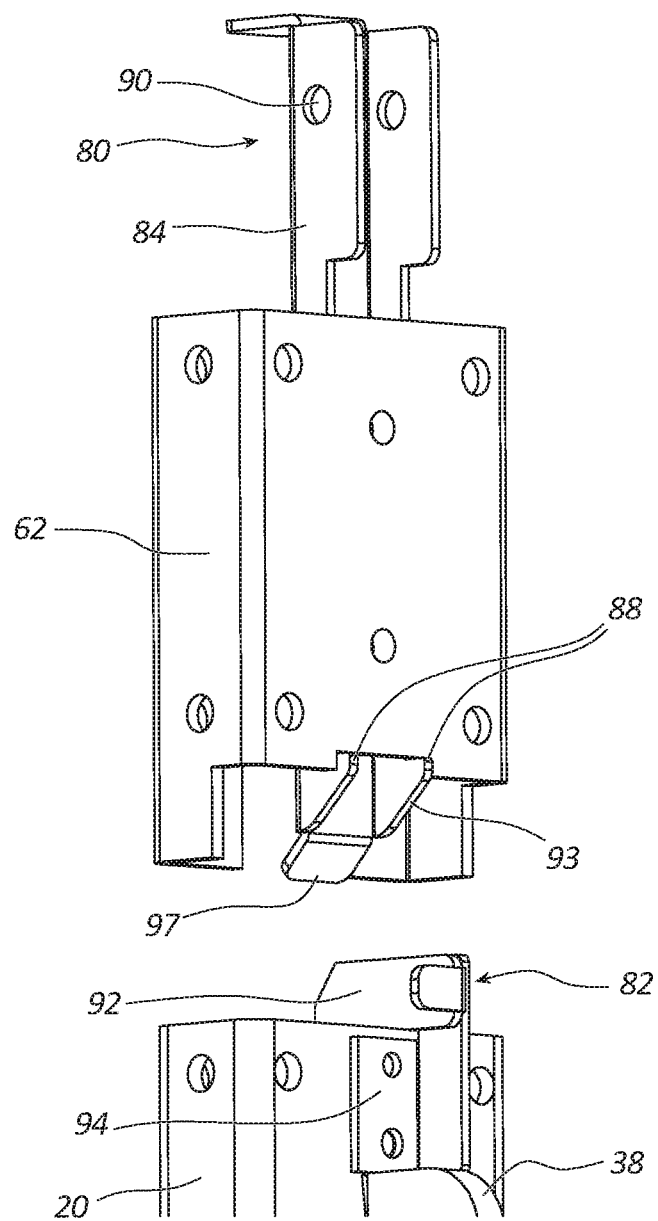
FIG. 12 is a perspective view of the bed support mechanism in FIG. 11 with the release mechanism in a position where it prevents the catch mechanism from holding the upper carriage member.
Figure 13:
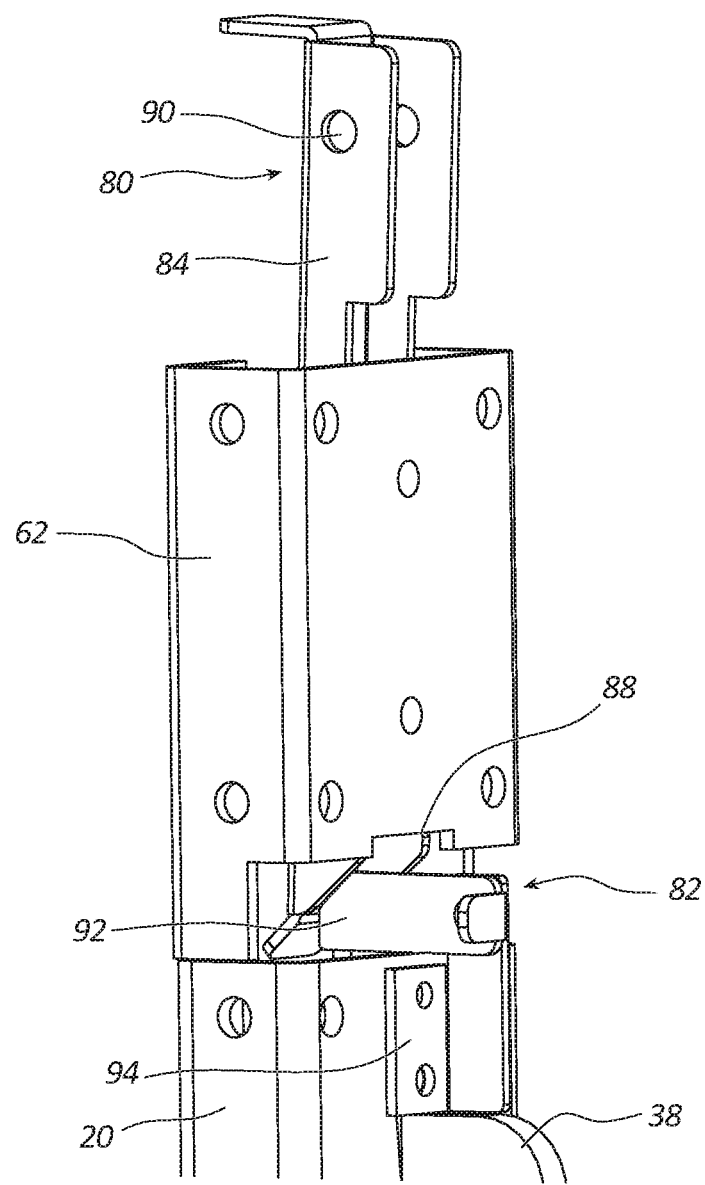
FIG. 13 is a perspective view of the bed support mechanism in FIG. 12 showing the upper and lower carriage members being positioned next to each other and the release mechanism pushing the catch mechanism to a position where it prevents the catch mechanism from holding the upper carriage member.

The release mechanism 82 includes a release member 92 rotatably coupled to a base member 94. The release mechanism 82 moves between a first position where the release mechanism 82 prevents the catch mechanism 80 from holding the upper bed 41 in the raised position and a second position where the release mechanism 82 does not prevent the catch mechanism 80 from holding the upper bed 41 in the raised position. The first position corresponds to the release member 92 being in an engaged position as shown in FIGS. 12-13. The second position corresponds to the release member 92 being in a disengaged position as shown in FIGS. 7, 10, and 11.

When the release mechanism 82 is in the first position, the catch mechanism 80 disengages from the upper carriage member 62 thereby allowing the upper bed 641 to move to the lowered position. When the release mechanism 82 is in the second position, the catch mechanism 80 engages the upper carriage member 62 and holds it and the upper bed 41 in the raised position.

The operation of the bed support mechanism is shown in FIGS. 5-7 and 10-13. FIGS. 5-7 show the beds 40, 41 in a slightly lowered position where the lower bed 40 is underneath the upper bed 41. The release mechanism 82 is in the second position where it does not prevent the catch mechanism 80 from holding the upper bed 41 in the raised position. As described in the incorporated documents, the lower bed 40 can be part of a lower bed assembly that is configured to support the weight of the upper bed 41 as it moves between the lowered position and the raised position (the upper bed can also be part of an upper bed assembly).

This can be accomplished in a number of ways. In one implementation, the lower carriage member 20 can contact and support the weight of the upper carriage member 62. In another implementation, the lower bed 40 can contact the underside of the upper bed 41. As an aside, it should be noted that the bed assemblies can include the respective bed 40, 41 as well as the bed support bracket and the respective moving assembly 50, 51.

As the beds 40, 41 rise, the upper carriage member 62 slides over the main body 84 of the catch mechanism 80. The upper carriage member 62 rides up the sloped portion 93 at the bottom of the main body 84, which causes the main body 84 to pivot inward on the fastener 91 until the projections 88 reach the bottom edge of the carriage member 62. When the projections 88 clear the bottom edge of the carriage member 62, the biasing component 86 biases the main body 84 outward and the projections 88 extend under the bottom surface of the carriage member 62 thereby holding it in a fixed position as shown in FIG. 10. The release member 92 is in the disengaged position so it does not prevent the main body 84 from pivoting outward and catching the bottom of the upper carriage member 62.

With the upper bed 41 held securely in position by the catch mechanism 80, the user can now lower the lower bed 40 to any position the user desires. For example, the user can lower the lower bed 40 to the configurations shown in FIGS. 3-4.

The user can lower the upper bed 41 using the following procedure. When the lower carriage member 20 is positioned below the upper carriage member 62 in the manner shown in FIGS. 11-12, the use can adjust the release mechanism 82 to the first position. The user can do this by pivoting or flipping the release member 92 a little more than 180 degrees until it is in the position shown in FIGS. 12-13. In this position, the release member 92 will engage the main body 84 of the catch mechanism 80 when the lower carriage member 20 is raised to a position just underneath the upper carriage member 62 as shown in FIG. 13.

As the lower carriage member 20 rises, the release number 92 rides up the tabular ramp 97 positioned at the bottom of the main body 84 causing the main body 84 to pivot inward so that the projections 88 no longer engage the bottom edge of the upper carriage member 62. The upper carriage member 62 can now clear the projections 88 on the catch mechanism 80 and move downward with the lower bed 40.

It should be appreciated that the bed lift 12 can be operated in a number of ways depending on the initial state of the system. For example, if both beds 40, 41 are in the lowered position and the release mechanism 82 is in the first position, then the beds 40, 41 can be raised and lowered without the upper bed 41 being held in the raised position. However, if the release mechanism 82 is in the second position, then raising the beds 40, 41 to the raised position will cause the upper bed 41 to be held in the raised position by the catch mechanism 80. If the user wants to hold the upper bed 41 in the raised position and both beds 40, 41 are in the raised position but the release mechanism 82 is in the second position, then the user can lower the beds 40, 41 until the lower bed 40 separates from the upper bed 41, adjust the release mechanism 82 to the first position, raise the beds 40, 41 to the raised position where the catch mechanism 80 holds the upper bed 41, and then lower the lower bed 40. Numerous other methods of operating the bed lift 12 are possible.

It should also be appreciated that the bed support mechanism can have other configurations. In one implementation, the catch mechanism 80 can be positioned on the upper carriage assembly 62 (e.g., attached to the upper carriage member 62) and the release mechanism 82 can be coupled to the guide rail 61. In this implementation, the user adjusts the release mechanism 82 between the first position and the second position, as desired, to selectively actuate the catch mechanism 80 and hold or release the upper bed 41.

In another implementation, the upper carriage member 62 and the release member 92 can be configured in a manner to allow the release member 92 to rotate between the engaged position and the disengaged position when the carriage members 20, 62 are positioned next to each other in the manner shown in FIG. 7. For example, the release member 92 can be shortened and the back wall of the main body 84 can be brought forward so that the release member 92 can clear the bottom edge of the upper carriage member 62 when it moves. Alternatively, or in addition, the notch in the bottom edge of the upper carriage member 62 can be raised so that the release member 92 can clear it when it flips from one position to the other.

In another implementation, the bed lift 12 can include an electronic control system configured to move the release mechanism 82 between the first position and the second position. The electronic control system can include a switch that the user can activate to move the release mechanism 82. It can also include one or more actuators, such as electric motor actuators, configured to move the release mechanism 82 between the first position and the second position. The user can use the switch to select the position of the release mechanism 82 and then raise and lower the beds 40, 41 accordingly to either hold the upper bed 41 in the raised position or release the upper bed 41 from the raised position.

Illustrative Implementations

The following is a description of various implementations of the disclosed subject matter. Each implementation may include one or more of the various features, characteristics, or advantages of the disclosed subject matter. The implementations are intended to illustrate a few aspects of the disclosed subject matter and should not be considered a comprehensive or exhaustive description of all possible implementations.

P1. A vehicle comprising: a lower bed; an upper bed positioned above the lower bed, the lower bed and the upper bed being movable between a lowered position where the lower bed and the upper bed are spaced apart and a raised position where the lower bed and the upper bed are stowed; a catch mechanism configured to hold the upper bed in the raised position; and a release mechanism movable between a first position where the release mechanism prevents the catch mechanism from holding the upper bed in the raised position and a second position where the release mechanism does not prevent the catch mechanism from holding the upper bed in the raised position.

P2. The vehicle of paragraph P1 wherein the catch mechanism includes a biasing component that biases the catch mechanism towards a position where the catch mechanism holds the upper bed in the raised position.

P3. The vehicle of any one of paragraphs P1-P2 wherein the catch mechanism includes a biasing component; wherein the catch mechanism is movable between a first position where the catch mechanism holds the upper bed in the raised position and a second position where the catch mechanism does not hold the upper bed in the raised position; and wherein the biasing component biases the catch mechanism towards the first position.

P4. The vehicle of paragraph P3 wherein the catch mechanism rotates between the first position and the second position.

P5. The vehicle of any one of paragraphs P1-P4 wherein the release mechanism moves with the lower bed between the lowered position and the raised position.

P6. The vehicle of any one of paragraphs P1-P5 wherein the lower bed and the upper bed are movable between a double bunk configuration where the lower bed and the upper bed are in the lowered position, a single bunk configuration where the lower bed is in the lowered position and the upper bed is in the raised position, and a stowed configuration where the lower bed and the upper bed are in the raised position.

P7. The vehicle of any one of paragraphs P1-P6 wherein the vehicle is a recreational vehicle.

P8. The vehicle of any one of paragraphs P1-P7 wherein the lower bed and the upper bed are positioned adjacent to a ceiling of the vehicle in the raised position.

P9. A bed lift comprising: a guide rail; a first carriage assembly coupled to the guide rail, the first carriage assembly being configured to be coupled to a lower bed; a second carriage assembly coupled to the guide rail above the first carriage assembly, the second carriage assembly being configured to be coupled to an upper bed, the first carriage assembly and the second carriage assembly being movable between a lowered position where the first carriage assembly and the second carriage assembly are spaced apart and a raised position where the first carriage assembly and the second carriage assembly are positioned adjacent each other; a catch mechanism coupled to one of the guide rail or the second carriage assembly, the catch mechanism being configured to hold the second carriage assembly in the raised position; and a release mechanism coupled to the other one of the guide rail or the second carriage assembly, the release mechanism being movable between a first position where the release mechanism prevents the catch mechanism from holding the second carriage assembly in the raised position and a second position where the release mechanism does not prevent the catch mechanism from holding the second carriage assembly in the raised position.

P10. The bed lift of paragraph P9 wherein the catch mechanism includes a biasing component; wherein the catch mechanism is movable between a first position where the catch mechanism holds the second carriage assembly in the raised position and a second position where the catch mechanism does not hold the second carriage assembly in the raised position; and wherein the biasing component biases the catch mechanism towards the first position.

P11. The bed lift of paragraph P10 wherein the catch mechanism rotates between the first position and the second position.

P12. The bed lift of any one of paragraphs P9-P11 wherein the catch mechanism rotates forward to hold the second carriage assembly in the raised position and rotates backward to allow the second carriage assembly to move from the raised position to the lowered position.

P13. The bed lift of paragraph P12 wherein the release mechanism pushes the catch mechanism backward when the release mechanism is in the first position.

P14. The bed lift of any one of paragraphs P9-P13 wherein the release mechanism rotates between the first position and the second position.

P15. The bed lift of any one of paragraphs P9-P14 wherein the first carriage assembly and the second carriage assembly are movable between a double bunk configuration where the first carriage assembly and the second carriage assembly are in the lowered position, a single bunk configuration where the first carriage assembly is in the lowered position and the second carriage assembly is in the raised position, and a stowed configuration where the first carriage assembly and the second carriage assembly are raised.

P16. A bed support mechanism comprising: a catch mechanism configured to be coupled to one of a guide rail or a carriage assembly of a bed lift, the catch mechanism being configured to hold a bed in a raised position; and a release mechanism configured to be coupled to the other one of the guide rail or the carriage assembly, the release mechanism being movable between a first position where the release mechanism prevents the catch mechanism from holding the bed in the raised position and a second position where the release mechanism does not prevent the catch mechanism from holding the bed in the raised position.

P17. The bed support mechanism of paragraph P16 wherein the catch mechanism includes a biasing component; wherein the catch mechanism is movable between a first position where the catch mechanism holds the bed in the raised position and a second position where the catch mechanism does not hold the bed in the raised position; and wherein the biasing component biases the catch mechanism towards the first position.

P18. The bed support mechanism of any one of paragraphs P16-P17 wherein the catch mechanism is configured to be coupled to one of the guide rail or the carriage assembly of a bed lift including a lower bed and an upper bed; and wherein the catch mechanism is configured to hold the upper bed in a raised position.

P19. A method comprising: moving a lower bed and an upper bed to a raised position with a bed lift, the upper bed being positioned above the lower bed, the bed lift including: a catch mechanism configured to hold the upper bed in the raised position; and a release mechanism movable between a first position where the release mechanism prevents the catch mechanism from holding the upper bed in the raised position and a second position where the release mechanism does not prevent the catch mechanism from holding the upper bed in the raised position; and moving the lower bed from the raised position to a lowered position with the release mechanism in the second position and the catch mechanism holding the upper bed in the raised position.

P20. The method of paragraph P19 comprising: moving the release mechanism from the first position to the second position; moving the lower bed from the lowered position to the raised position; and moving the lower bed and the upper bed from the raised position to the lowered position.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative implementations where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any implementation, feature, or combination of features described or illustrated in this document. This is true even if only a single implementation of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, and the like can be permanent, readily releasable, or difficult to release depending on the application.

Drawing Related Terminology and Interpretative Conventions

The drawings are intended to illustrate implementations that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

Spatial or directional terms, such as "left," "right," "front," "back," and the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

INCORPORATION BY REFERENCE

The entire contents of each of the documents listed below are incorporated by reference into this document (the documents are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

U.S. Prov. App. No. 62/617,219, titled "Bed Support System for a Bed Lift," filed on 13 Jan. 2018.

U.S. Pat. No. 8,336,940 (application. Ser. No. 13/270,046), titled "Structure Including an Item That Moves Vertically," filed on 10 Oct. 2011, issued on 25 Dec. 2012.

U.S. Pat. No. 9,656,590 (application Ser. No. 14/714,215), titled "Bed Lift Mounting Member," filed on 15 May 2015, issued on 23 May 2017.

The invention claimed is:

1. A vehicle comprising:
a lower bed;
an upper bed positioned above the lower bed, the lower bed and the upper bed being movable between a lowered position where the lower bed and the upper bed are spaced apart and a raised position where the lower bed and the upper bed are stowed;
a catch mechanism configured to rotate between a first position where the catch mechanism holds the upper bed in the raised position and a second position where the catch mechanism does not hold the upper bed in the raised position; and
a release mechanism movable between a first position where the release mechanism prevents the catch mechanism from holding the upper bed in the raised position and a second position where the release mechanism does not prevent the catch mechanism from holding the upper bed in the raised position.

2. The vehicle of claim 1 wherein the catch mechanism includes a biasing component that biases the catch mechanism towards the first position.

3. The vehicle of claim 1 wherein the release mechanism moves with the lower bed between the lowered position and the raised position.

4. The vehicle of claim 1 wherein the lower bed and the upper bed are movable between a double bunk configuration where the lower bed and the upper bed are in the lowered position, a single bunk configuration where the lower bed is in the lowered position and the upper bed is in the raised position, and a stowed configuration where the lower bed and the upper bed are in the raised position.

5. The vehicle of claim 1 wherein the vehicle is a recreational vehicle.

6. The vehicle of claim 1 wherein the lower bed and the upper bed are positioned adjacent to a ceiling of the vehicle in the raised position.

7. A method comprising:
moving the lower bed and the upper bed in the vehicle of claim 1 to the raised position; and
moving the lower bed from the raised position to the lowered position with the release mechanism in the second position and the catch mechanism in the first position.

8. The method of claim 7 comprising:
moving the release mechanism from the first position to the second position;
moving the lower bed from the lowered position to the raised position; and
moving the lower bed and the upper bed from the raised position to the lowered position.

9. The vehicle of claim 1 wherein the catch mechanism rotates forward to hold the upper bed in the raised position and rotates backward to allow the upper bed to move from the raised position to the lowered position.

10. The vehicle of claim 1 wherein the release mechanism rotates between the first position and the second position.

11. A vehicle comprising:
a guide rail coupled to a wall of the vehicle;
a first carriage assembly coupled to the guide rail, the first carriage assembly being configured to move along the guide rail;
a second carriage assembly coupled to the guide rail above the first carriage assembly, the second carriage assembly being configured to move along the guide rail;
a lower bed coupled to the first carriage assembly;
an upper bed coupled to the second carriage assembly, the first carriage assembly and the second carriage assembly being movable between a lowered position where the first carriage assembly and the second carriage assembly are spaced apart and a raised position where the first carriage assembly and the second carriage assembly are positioned adjacent each other;
a catch mechanism coupled to one of the guide rail or the second carriage assembly, the catch mechanism being configured to rotate between a first position where the catch mechanism holds the second carriage assembly in the raised position and a second position where the catch mechanism does not hold the second carriage assembly in the raised position; and
a release mechanism coupled to the other one of the guide rail or the second carriage assembly, the release mechanism being movable between a first position where the release mechanism prevents the catch mechanism from holding the second carriage assembly in the raised position and a second position where the release mechanism does not prevent the catch mechanism from holding the second carriage assembly in the raised position.

12. The vehicle of claim 11 wherein the catch mechanism includes a biasing component that biases the catch mechanism towards the first position.

13. The vehicle of claim 11 wherein the catch mechanism rotates forward to hold the second carriage assembly in the raised position and rotates backward to allow the second carriage assembly to move from the raised position to the lowered position.

14. The vehicle of claim 13 wherein the release mechanism pushes the catch mechanism backward when the release mechanism is in the first position.

15. The vehicle of claim 11 wherein the release mechanism rotates between the first position and the second position.

16. The vehicle of claim 11 wherein the lower bed and the upper bed are movable between a double bunk configuration where the lower bed and the upper bed are in the lowered position, a single bunk configuration where the lower bed is in the lowered position and the upper bed is in the raised position, and a stowed configuration where the lower bed and the upper bed are in the raised position.

17. The vehicle of claim 11 wherein the release mechanism moves with the first carriage assembly between the lowered position and the raised position.

18. The vehicle of claim 11 wherein the vehicle is a recreational vehicle.

19. A method comprising:
moving the first carriage assembly and the second carriage assembly in the vehicle of claim 11 to the raised position; and
moving the first carriage assembly from the raised position to the lowered position with the release mechanism in the second position and the catch mechanism in the first position.

20. The method of claim 19 comprising:
moving the release mechanism from the first position to the second position;
moving the first carriage assembly from the lowered position to the raised position; and
moving the first carriage assembly and the second carriage assembly from the raised position to the lowered position.

* * * * *